United States Patent [19]

Gray

[11] Patent Number: 5,200,987

[45] Date of Patent: * Apr. 6, 1993

[54] REMOTE SUPERVISORY MONITORING AND CONTROL APPARATUS CONNECTED TO MONITORED EQUIPMENT

[76] Inventor: William F. Gray, Ste. 204, 203 Eldon St., Herndon, Va. 22074

[*] Notice: The portion of the term of this patent subsequent to May 31, 2005 has been disclaimed.

[21] Appl. No.: 642,880

[22] Filed: Jan. 18, 1991

Related U.S. Application Data

[63] Continuation of Ser. No. 149,671, Jan. 28, 1988, Pat. No. 4,996,703, which is a continuation-in-part of Ser. No. 853,893, Apr. 21, 1986, Pat. No. 4,478,654.

[51] Int. Cl.$^5$ .................... H04M 11/04; H04M 11/00
[52] U.S. Cl. .................................. 379/40; 379/39; 379/105
[58] Field of Search ................................ 379/40, 105

[56] References Cited

U.S. PATENT DOCUMENTS

| | | | |
|---|---|---|---|
| 3,820,074 | 6/1974 | Toman | 379/104 |
| 3,925,622 | 12/1975 | Robinson | 379/51 |
| 4,095,050 | 6/1978 | Beachem et al. | 379/105 |
| 4,150,428 | 4/1979 | Inrig et al. | 364/200 |
| 4,172,280 | 10/1979 | Spiesman | 364/107 |
| 4,213,174 | 6/1980 | Morley et al. | 364/104 |
| 4,482,785 | 11/1984 | Finnegan et al. | 379/41 |
| 4,490,986 | 1/1985 | Paddock | 340/527 |
| 4,493,947 | 1/1985 | Loveless | 379/51 |
| 4,507,730 | 3/1985 | Johnson et al. | 364/200 |
| 4,510,350 | 4/1985 | Wagner et al. | 379/51 |
| 4,554,418 | 11/1985 | Toy | 379/88 |
| 4,558,181 | 12/1985 | Blanchard et al. | 379/40 |
| 4,578,540 | 3/1986 | Borg et al. | 379/40 |
| 4,591,967 | 5/1986 | Mattes et al. | 364/132 |
| 4,598,286 | 7/1986 | Miller et al. | 340/825.96 |
| 4,665,544 | 5/1987 | Honda et al. | 379/104 |
| 4,716,582 | 12/1987 | Blanchard et al. | 379/40 |
| 4,748,654 | 5/1988 | Gray | 379/40 |
| 4,791,658 | 12/1988 | Simon et al. | 379/41 |
| 4,856,047 | 8/1989 | Saunders | 379/40 |
| 4,872,195 | 10/1989 | Leonard | 379/40 |

FOREIGN PATENT DOCUMENTS

| | | | |
|---|---|---|---|
| 51383 | 5/1982 | European Pat. Off. | 379/51 |
| 59-221142 | 12/1984 | Japan | 379/51 |
| 2106354 | 3/1983 | United Kingdom | 379/40 |
| 2138981 | 10/1984 | United Kingdom | |

OTHER PUBLICATIONS

PageTek, Inc. Raleigh, N.C., brochure entitled "New from PageTek... Protect Remote Transmitter Site! ProTek Means Less Down-Time & Fewer Service Calls. You Get Full Remote Control".

(List continued on next page.)

Primary Examiner—James L. Dwyer
Assistant Examiner—Jason Chan
Attorney, Agent, or Firm—Leydig, Voit & Mayer

[57] ABSTRACT

A monitoring and control system has a programmable apparatus connected to equipment to be monitored. The apparatus receives inputs from the monitored equipment, detects alarm conditions when the monitored inputs reach predetermined values, dials automatically over the telephone network to reach an operator when an alarm condition is detected, provides complete status of monitor and control ports by synthesized voice, operates under programs in an operator-controlled mode or in an automatic mode to produce control signals of different form to control the monitored equipment in response to control commands from a first source when in the operator controlled mode and from a second source when in the automatic mode, the progams providing the second source of control commands when in the automatic mode and defining:

(a) the source of control commands according to whether the apparatus is in operator-controlled or automatic mode and
(b) the response to the control commands represented by the form of the control signals at the output ports of the microprocessor.

8 Claims, 6 Drawing Sheets

OTHER PUBLICATIONS

PageTek, Inc., Raleigh, N.C. "ProTek Automatic Remote Site Protector" technical description.
Butler National Corp., "ADAS II" Operational Manual, Revision O, Sep. 1982.
Fire Burglary Instruments, Inc., Hauppauge, N.Y., Brochure, ". . . With Voice Response Secur-Fone You'll Have the Sales Edge", ©1985.
Fire Burglary Instruments, Inc., Hauppauge, N.Y., Brochure: "Secur-Fone Security Made Simple", 1986.
Telemonitor, "MASTER*LINK Your ON-Site Field Engineer and Headquarters Analyst", Bulletin No. 108 Jun. 1987.
Telemonitor, "CAFE What Managers Should Know About Computer Aided Field Engineering", Bulletin No. 10 Jun. 1987.
Telemonitor, "MASTER*LINK For Superior Microwave and Satellite Performance" Undated Brochure.
Telemonitor, "MASTER*LINK Application Brief 'Network Site Management'" Bulletin No. 127 Oct. 1988.
Capital Control Co., Inc., "Advance Series 1520 Automatic Dialing Alarm Monitor", Instruction Manual Bulletin B3815203 1985.
Telemonitor, "MASTER*LINK Management From Any Push-Button Telephone", Bulletin No. 102 Nov. 1985.
Int'l Pub. No. WO80/00290, Bartelink Remote Supervisory System. Feb. 1980.

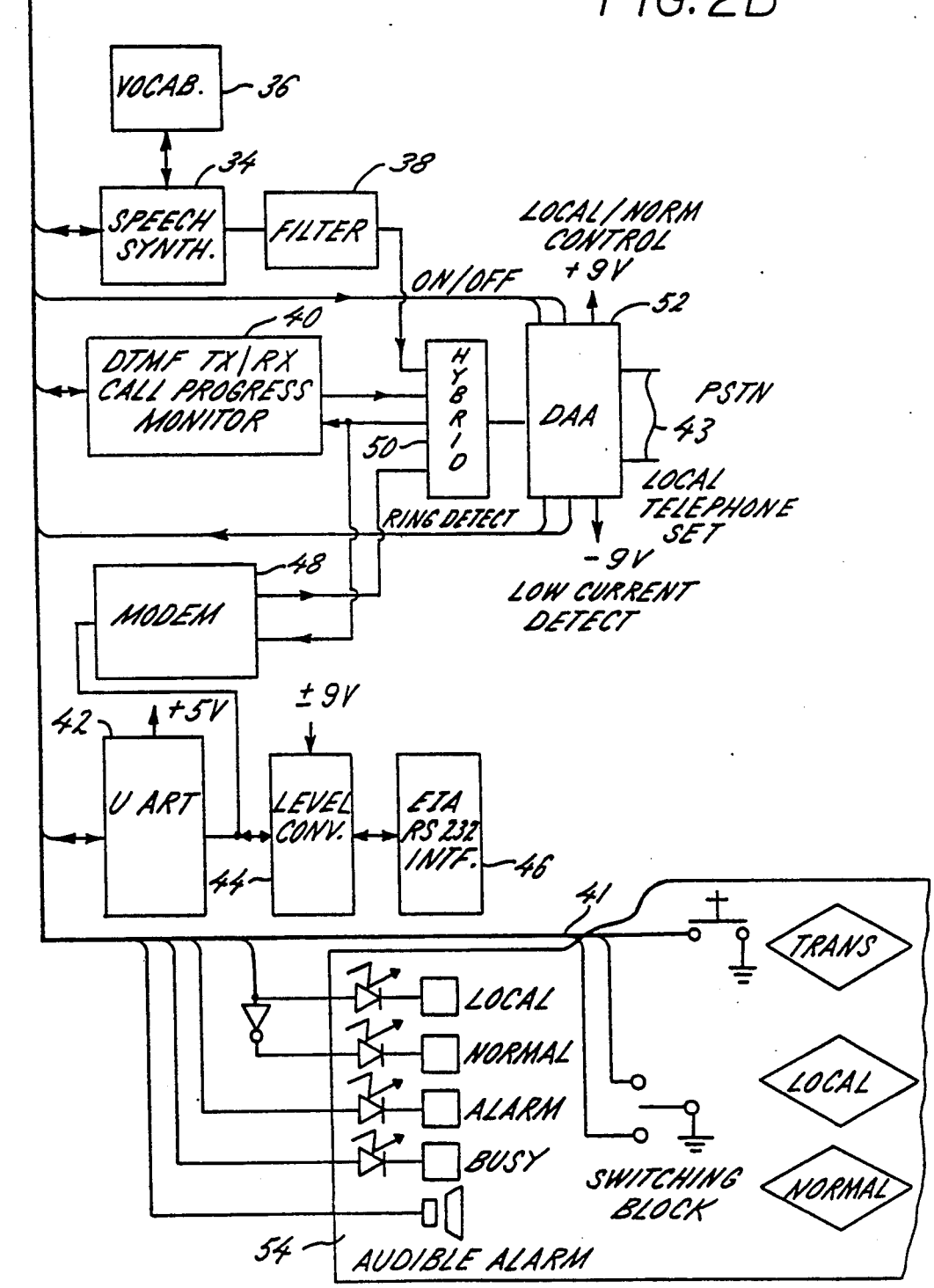

REMOTE SUPERVISORY MONITORING AND CONTROL APPARATUS CONNECTED TO MONITORED EQUIPMENT

This application is a continuation of application Ser. No. 07/149,671, filed on Jan. 28, 1988 now U.S. Pat. No. 4,996,703 which is a continuation-in-part of application Ser. No. 06/853,893 filed on Apr. 21, 1986 now U.S. Pat. No. 4,478,654.

TECHNICAL FIELD

This invention relates to supervisory monitor control apparatus having particular application to uses in remote locations and which do not require the use of personnel at that remote location. More particularly, the invention relates to apparatus of the foregoing nature which is programmable to define the source of control commands and the response to the control commands depending on whether the apparatus in in an operator-controlled or automatic mode.

BACKGROUND ART

Supervisory control apparatus of the type here in question generally electrically monitor various operation parameters at an unmanned operating site. If a deviation in a desired range of parameters is noted, the apparatus conventionally generates alarms which are then transmitted to a central location. At the central location, there is usually a control center which contains equipment capable of displaying the existence of an alarm and/or various operating parameter levels on command. This control center is, as well, generally equipped with a control apparatus which can be manipulated by an operator to correct defects in or minimize the effects of malfunctions in the monitored equipment at the remote site. This form of operation has as its ultimate purpose the improvement of performance in an unmanned equipment site. In addition, the removal of the necessity for sending a repair crew or operating personnel to the remote site provides a major cost savings.

In conventional systems the central location is generally equipped with a computer having appropriate peripheral equipment and connected to the remote location, usually through leased telephone lines. Generally speaking, the equipment at the remote location is specifically programmed to operate in a given manner in response to various conditions and to produce corresponding signals. In order to effect a change in monitoring operations, the monitoring equipment at the remote site must be reprogrammed there, or, perhaps, changes in the programming of the remote equipment can be effected by means of the computer at the central location through the aforementioned telephone lines. As might be expected, the central control center must be manned at all times to ensure the proper operation of the system.

More recent developments in systems of this nature have permitted such supervisory monitor and control apparatus to use the telephone dial-up network and a standard push-button telephone to communicate with the remote site. The developments include the provision of voice synthesis equipment at the remote site to communicate information to the user, and the operator can use push-buttons on his telephone to produce dual tone, multi-frequency (DTMF) signals to enter various user access codes to set control switches and the like at the remote site. Again, however, programming of the monitoring and alarm equipment at the remote site must still be done at a central location using a computer found at that location. Consequently, in the prior art systems, despite the fact that the remote supervisory apparatus is accessible via a push-button telephone, if errors in operation should be noted, the apparatus cannot be reprogrammed from the push-button telephone to make the necessary corrections or changes.

DISCLOSURE OF THE INVENTION

It is an object of this invention to provide an unmanned remote supervisory monitor and control system which is accessible via the public telephone network and which can be programmed from a push-button telephone at any location in a public telephone network.

It is another object of this invention to provide an unmanned remote supervisory monitor and control apparatus which permits retrieval of archival data concerning the operation of the equipment being monitored.

Another object of this invention is to provide an apparatus meeting the foregoing objects and which, in addition to providing voice synthesized outputs concerning existing conditions, provides a voice synthesized output containing a menu to guide a user through the operation of the apparatus.

Another object of this invention is to provide means for evaluating alarm criteria and to prioritize alarm reporting which reduces false alarms and nuisance alarms.

Another object of this invention is to provide means for reporting alarm and status information to a plurality of users using synthesized voice and/or printers using data transmission.

The foregoing and other objects are obtained in an unmanned remote supervisory control apparatus providing means for responding to a push-button telephone output for changing operating parameters at the supervised site. The operator need only access the apparatus of the invention through the use of a valid password to enter new parameters over any push-button telephone. The apparatus contains means for responding to any push-button telephone anywhere to provide complete status of monitor and control ports plus active alarms in addition to the programming functions described above.

The apparatus is operable in an operator-controlled or an automatic mode to control equipment in view of monitored conditions of the equipment announced to an operator by synthesized voice over the telephone network.

Conventional digital and analog monitoring devices are used at a remote site to monitor such parameters as signal strengths, temperatures, power, pressure, switch closures, and the like. These are compared to high/low thresholds and normal closure positions to determine alarm conditions. Should there be a measured condition which exceeds one of the thresholds, the apparatus contains means for dialing in sequence up to six different telephone numbers to attempt to alert operating personnel of an alarm condition. When a telephone is answered at one of those locations, the condition is described by a synthesized voice to the user after the supervisory control apparatus receives a valid password keyed in by the user.

The apparatus is programmable to define the source of control commands and the response to the control commands depending on whether the apparatus is in an operator-controlled or automatic mode.

BRIEF DESCRIPTION OF THE DRAWINGS

FIGS. 2A, 2B, and 2C, taken together, are a detailed schematic diagram of a preferred embodiment of a remote supervisory apparatus in accordance with the principles of the invention;

BEST MODE FOR CARRYING OUT THE INVENTION

Figure 1:
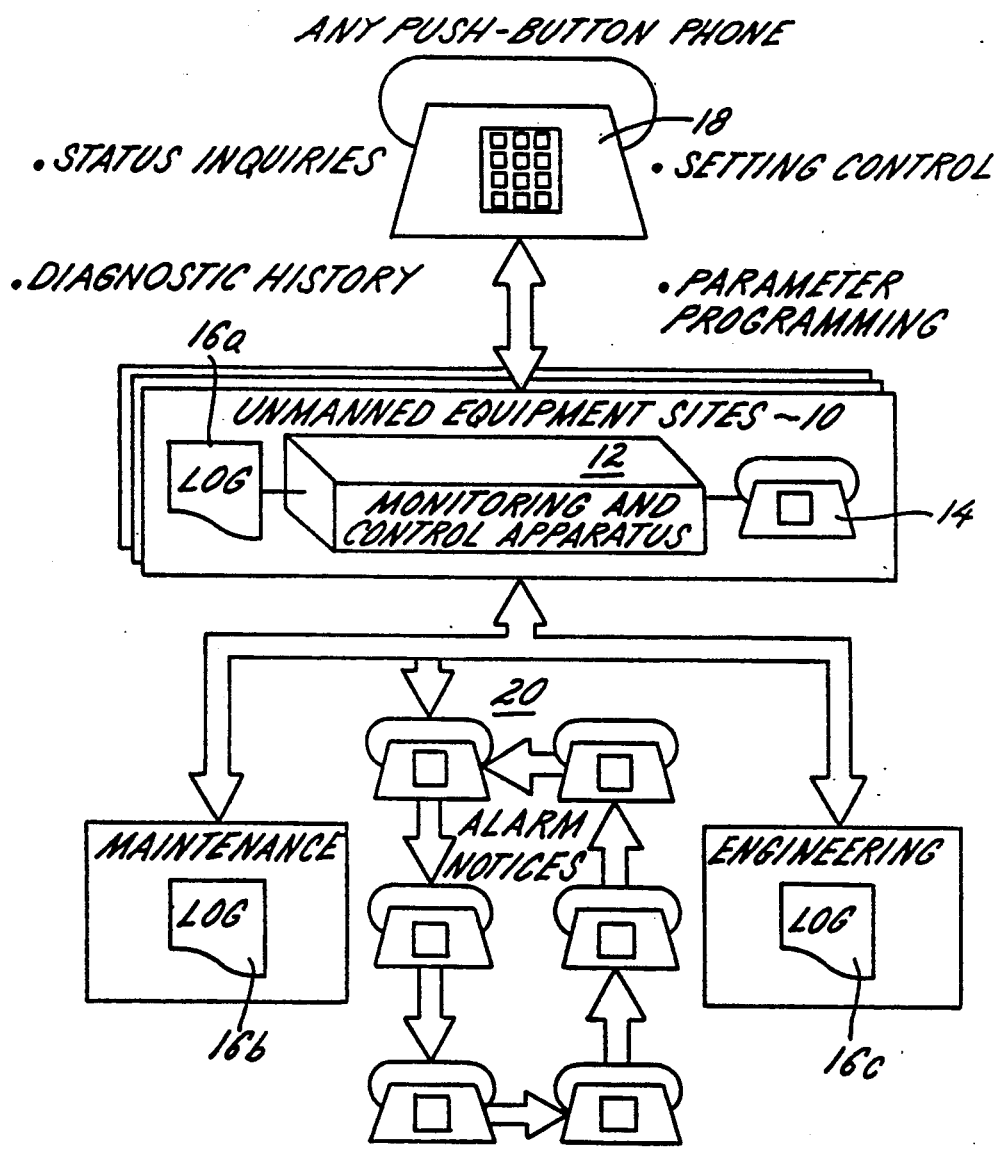
FIG. 1 is a block diagram of a complete system using the remote supervisory and monitoring apparatus of the invention.

FIG. 1 illustrates in diagrammatic form a system arrangement which utilizes the supervisory monitor and control system of the invention. Remote operating site 10, at which is located a monitoring and control system 12 which is constructed according to the principles of the invention, may include any form of equipment which requires monitoring of its operating parameters. In addition, at the remote site is a conventional push-button telephone 14 connected to system 12 and a printer 16 similarly connected to system 12.

Push-button telephone 18 which is shown to be in two-way communication with system 12 may be any push-button telephone located anywhere in a public telephone system. As indicated, a user may perform any of four functions from the push-button telephone. After accessing system 12 through the use of a password, an inquiry may be made as to the status of the various operating parameters and alarm conditions. If desired, the operator, again through the transmission of an appropriate code to the system 12, can obtain a recent maintenance history of the monitored site. This history contains a listing of alarm conditions, including alarm port and alarm description, date and time, alarm duration in days, hours, minutes, and seconds, along with the operator's identity number and site identification. If it is found that the monitored equipment is operating improperly or other forms of operation or parameter changes are needed, system 12 may be programmed from the push-button telephone to achieve the desired operation. Finally, should an alarm condition be noted, certain controls at the remote site can be set, either by communicating DTMF signals from the push-button telephone to system 12, which in turn makes the appropriate switch settings to carry out the control function, or by automatic mode. In automatic mode, the alarm condition is programmed to set certain controls without operator intervention.

A plurality of telephones 20 are additionally shown in FIG. 1. Should system 12 note an alarm condition, it can be programmed to call in sequence, in this example, up to six telephones at any six locations to attempt to reach a user who can take the appropriate steps to correct the condition. When one of the users is reached, as discussed above, he may request additional diagnostic information by simply using the telephone keypad. The user may also direct a control function to initiate remote testing and to switch to standby equipment.

Every transaction may be logged on printer 16(a) at the equipment site and at the same time transmitted to printers 16(b) and 16(c) at any other locations with a telephone. Logged information includes, for example, time to the nearest second, site identification, alarm port and activity description, date, and the individual involved in the operations.

Figure 2A:
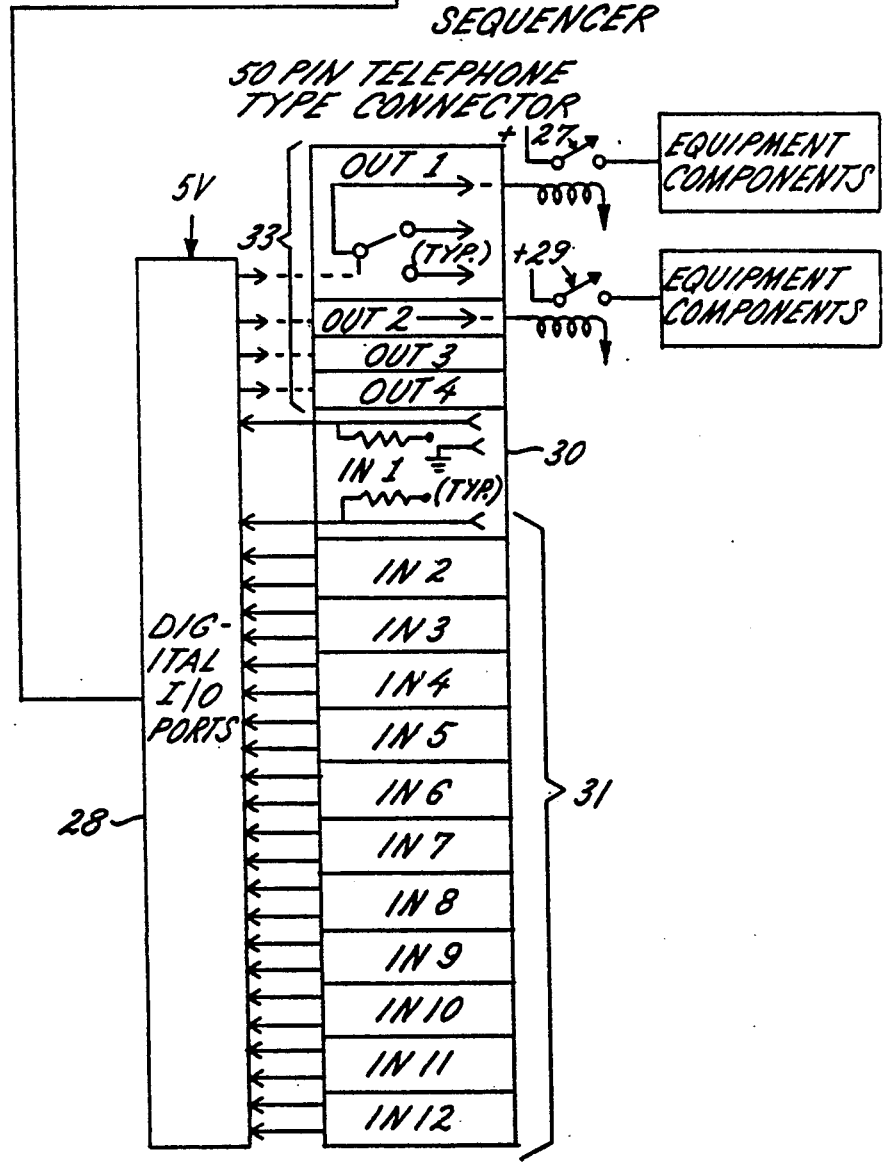
Figure 2C:
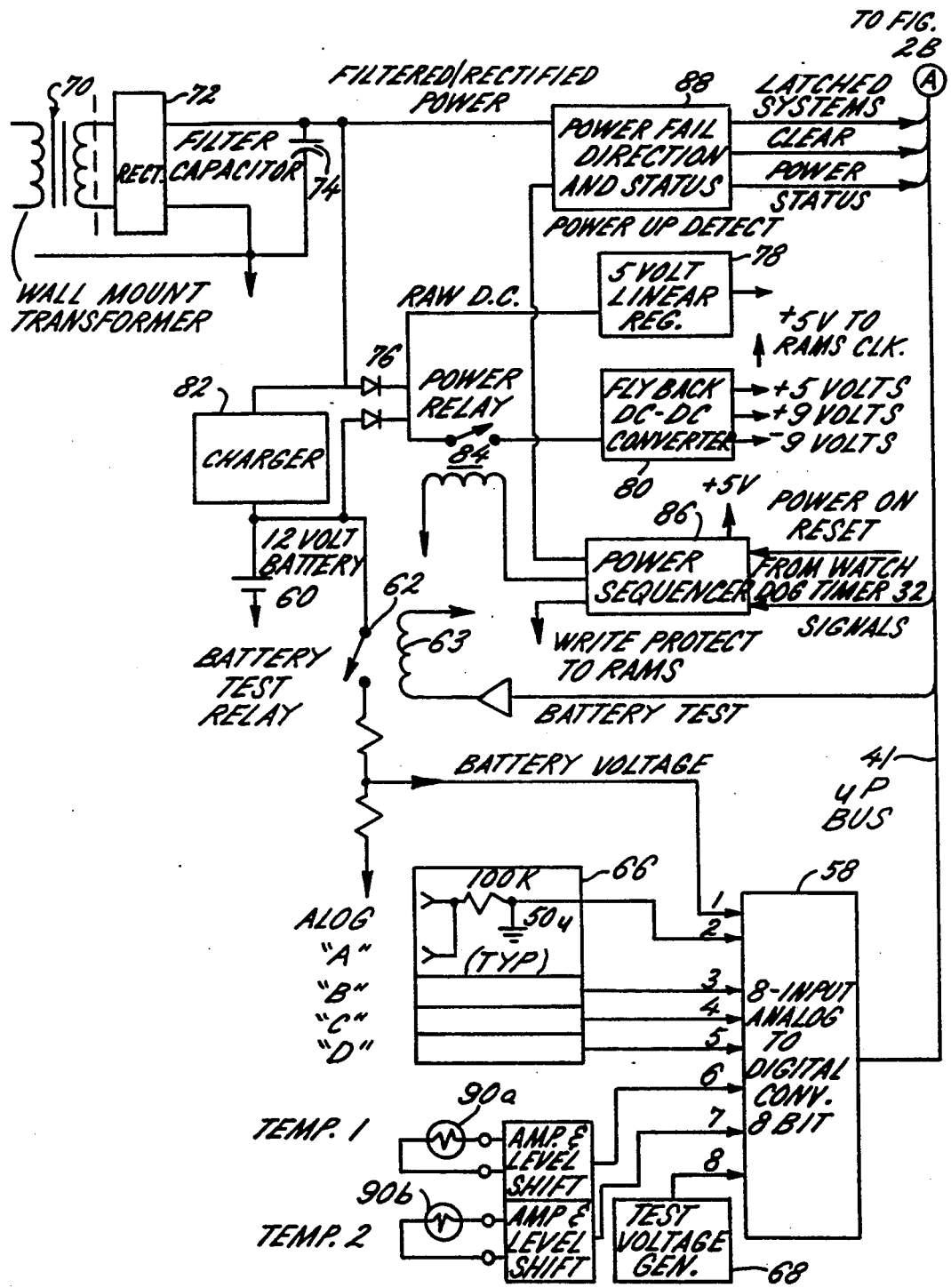

In FIG. 2 is shown a detailed schematic diagram of a preferred form of construction of system 12.

The entirety of the operations of system 12 are monitored and controlled by means of a conventional microprocessor 20 which in this example is a NSC800 chip manufactured by National Semiconductor Corporation. The microprocessor 20, in conjunction with memory and input/output (I/O) devices, form the hardware of the invention. The devices are all connected together by the microprocessor bus 41. The microprocessor executes a program stored in memory 26 and has configuration parameters stored in memory 24. Block 24 is random access memory (RAM) for storage of various variables and parameters. The remaining devices connected to the microprocessor bus are I/O devices and are used in this combination to form the supervisory monitor and control system.

A real time clock us used to provide time and date status to the software It also provides interrupts to the microprocessor to initiate sensor scanning. The real time clock 22 is implemented in hardware and connected to the microprocessor bus.

A watchdog timer 32 is used as a safeguard device to ensure that the microprocessor 20 is properly executing the program. The watchdog timer 32 must be serviced at strict time intervals If it is not serviced at strict time intervals, it is indicative of the microprocessor 20 not executing the stored program properly, and the watchdog timer 32 will reset the microprocesor 20.

A block of digital I/O ports is shown at 28. These are connected to the microprocessor 20 via data bus 41. In this embodiment, the block 28 of the digital I/O ports interfaces through a standard 50-pin connector 30 which, in this case, contains twelve alarm input ports 31 and four control output ports 33.

To control the monitored equipment in view of alarm conditions, signals are supplied to the control output port 33 in the form of digital control outputs OUT 1 and OUT 2 which drive switches 27 and 29, respectively. The operating characteristics of the switches 27 and 29 are defined by the system programmer.

First, in carrying out the invention, the system is programmable to operate the switches in different modes, for example, in a latched mode or a momentary mode, or in a sequence of switch state changes. If the switches are operated in a latched mode, they respond to a system control signal by switching into a desired setting They then remain at that setting until receiving a subsequent system control signal. If the switches are operated in a momentary mode, they reside in a normal state. In response to a programmed system operation, they switch to the opposite state for a short period of time and then return to the normal state. Only one programmed operation is required to effect the two switch state changes. The system programmer may program either the open or closed switch state to be the normal state. In addition, the programmer may program a sequence of state changes and intermediate time delays to achieve a desired control function. The switch operating characteristics are programmable on a per-switch basis.

Another device which might be referred to as an I/O device is a speech synthesizer 34 which is of conventional construction. In accordance with known programming principles, the microprocessor 20 commands speed synthesizer 34 to produce various words and to form them into recognizable sentences. The vocabulary for speech synthesizer 34 is contained in a read-only memory (ROM) 36. As is shown, the output of the speech synthesizer 34 is an analog signal having some energy in a frequency band which may not be accommodated by the telephone system. Accordingly, a filter 38 may be provided, as needed, to limit the speech synthesizer 34 analog output to the frequency band width of the telephone system to which system 12 is connected.

A dual tone, multi-frequency (DTMF) transceiver 40 of known construction is provided. In this example, it is constructed from a tupe 20C90 chip, as manufactured by Silicon Systems Inc. The receiver portion of the element 40 receives dual tone, multifrequency signals from a push-button telephone anywhere in the telephone network to receive various commands to cause the system to perform the various functions described above in connection with FIG. 1. As will be discussed, the user might be provided with a command menu which will guide him in providing the appropriate commands. The transmitter portion of element 40 permits dialing through the public telephone network. Transceiver 40 also includes a call progress monitor which is used in the dialing process to detect the various states during a call, such as a dial tone, busy, ring back, and the like. If, for example, a busy tone is detected, the microprocessor 20 will detect it, and the call will be placed later. When a dial tone is detected, element 40 dials and then waits for ring back or a busy signal. The call progress monitor also detects the absence of ring back, i.e., the operator answering the telephone.

Another I/O block connected to microprocessor bus 41 is a universal asynchronous receiver/transmitter (UART) 42 of conventional construction. In this example, it is a type NSC858 chip manufactured by National Semiconductor Corporation. As is known, this device is used for transmitting serial data. It is a single channel UART with a baud rate generator on the chip. As shown, element 42 connects to a level converter 44, which converts the signals to a level compatible with a standard EIA/RS232 signal output at EIA/RS232 interface 46.

UART 42 also is directly connected to a conventional modem 48. This modem serves to transmit bit serial data from UART 42 through the telephone line 43.

As illustrated, speech synthesizer 34, DTMF transceiver 40, and modem 48 each have analog outputs and are ultimately coupled to the public switched telephone network connected to by lines 43. The I/O ports of the foregoing components are connected, respectively, to a conventional hybrid circuit block 50. As is shown, a hybrid, such as element 50, is used to convert a standard two-wire interface from the public telephone network to a transmit and receive path. In this case, the transmit path is from the hybrid to the telephone network. This path comprises the output from speech synthesizer 34 and its filter 38, the output of modem 48, and the output from DTMF transceiver 40. The receive output of the hybrid 50 provides the inputs to the modem 48 and the DTMF transceiver 40. These inputs and outputs are coupled through the hybrid 50, are converted in a known manner, and are sent to a data access arrangement. This data access arrangement (DAA) 52 is a known device required in the United States by the Federal Communications Commission to comply with a rule known as FCC Part No. 68 for connections to public switched telephone networks. In essence, this element provides isolation to protect the telephone network from any electrical eccentricities of system 12.

Control signals to the DAA 52 effect off-hook control, and, with this control, the microprocessor 20 can connect the system 12 to the DTMF for dialing or answering calls. Control signals from DAA block 52 are the ring detect and line current signals. The line current detect indicates that either system 12 or the local telephone set are off-hook. The ring detect signal indicates that the public network is ringing system 12 by simply ringing its telephone number.

The DAA 52 can be controlled by a switch identified as a local/normal control in switching block 54. This switch performs the function of switching the local telephone set (not shown) from the switched network.

It can be said that switching block 54 is an interface between system 12 and a human operator. At this point, the operator can interact locally with system 12. The local and normal indicators in switching block 54 indicate system 12 is in the local mode in connecting a local telephone set and system 12. In the normal mode, communications flow between the remote location which system 12 is monitoring and the public telephone network. The local-normal toggle switch in switching block 54 is used to place a system 12 either on the public network or directly connected to the local telephone. A transfer request to this switch is used when the local operator picks up the ringing phone to form a system 12 call. The local operator may push the transfer switch in switching block 24 and hang-up his phone to put system 12 in contact with the remote caller.

The alarm indicator in switching block 54 will blink if there is an unacknowledged alarm. It will be on for an acknowledged alarm and off if no alarm is present. The alarm indicator is also used to indicate that the self-check or system check has, as detected by microprocessor 20, determined the existence of an error or defect in system 12 itself.

The busy indicator in switching block 54 indicates that system 12 is off-hook, either communicating locally through an operator or remotely through the telephone network. The audible alarm portion in switching block 54 is used by system 12 to alert a local operator, if one is present, to pick up the telephone set at the remote site in the local mode.

The last remaining I/O block connected to microprocessor 20 by data bus 41 is the analog-to-digital converter 58. This chip is a type ADC809 manufactured by National Semiconductor Corporation. It contains a multiplexer for selecting one of either analog inputs, and conversion is carried out by the successive approximation technique. In this embodiment, the digital output from the converter is eight bits in width. Its function is to receive analog signals from various sensors at the remote site and convert them into digital information for use by microprocessor 20.

Input 1 to converter 58 receives voltage from a battery 60 through battery test relay 62. Coil 63 of battery test relay 62 is periodically energized from a signal received over microprocessor bus 41 from microprocessor 20. The test relay operates to periodically test the state of charge of system battery 60. Inputs 2, 3, 4, and 5 to converter 58 are from circuit block 66 which is, in turn, connected to analog sensors a, b, c, and d. These sensors, for example, are, respectively, the appropriate types to detect such parameters as voltage, pressure, speed, chemical content, or the like. This analog information is then communicated to converter 58, converted to the appropriate digital information, and communicated via bus 41 to microprocessor 20.

Inputs 6 and 7 to the converter 58 are analog voltages representing the temperatures sensed by sensors 90a and 90b. The signals from the sensors are conditioned by the amplifiers and level shifters 22. This must be done to make these signals usable by the converter.

A test voltage generator 68 is provided on out-put 8 and is used to test the calibration of the converter 58 under the control of microprocessor 20.

The power supply components for system 12 supply normal power from a flyback converter 80 plus an uninterruptable power from a 5-volt linear regulator signal which is labelled as +5VA. The 5-volt linear regulator 78 supplies power to configuration memory 24 which is a non-volatile memory block. Similarly, it supplies power to the real time clock 22 and the power sequencing circuit 86 which must receive power at all times.

The power for the system 12 is provided from the alternating current means by means of a wall-mount transformer 70. The output of this transformer proceeds through a rectifier 72 and a filter capacitor 74. The rectified and filtered direct current produced is coupled through a set of isolation diodes 76 to supply current to the 5-volt linear regulator 78 of conventional construction and a flyback DC-DC convertor 80. The various sources of power at the illustrated voltages emanate from the latter two components.

A battery charger 82 charges battery 60 and maintains a constant voltage on the battery in the known manner. Power relay 84 controls flyback DC-DC converter 80 and is used to deactivate system 12 in case of a prolonged power outage. In the event of a power outage, after system 12 has performed all its alarm and logging operations, the system will deactivate itself by cutting off power to the DC-DC converter 80. If the flyback DC-DC converter 80 is disabled, the 5-volt linear rectifier 78 which provides non-volatile power will not be disabled. Flyback DC-DC converter 80 can be formed from any of a variety of known circuit devices, e.g., a Lambda-type Las6320 controll circuit. It performs a switching function at a rate of thousands of times per second to perform pulse width modification. A flyback converter of this tupe is characterized in that its output power is derived from inductively-stored energy and is transferred when the transistor switch is turned off.

Power relay 84 disables the flyback DC-DC converter 80 and is controlled by power sequencer 86 which is, in turn, under the control of microprocessor 20. This device performs the function, when necessary, of cutting off power to flyback DC-DC converter 80 and restarting the system when alternating current power is reapplied. It also performs "write protect" for non-volatile memory. As well, it protects random access memory 24 during power outage and during reset. Power sequencer 86 is formed by a logic circuit which compares power conditions to produce the desired result.

A power failure detection and status circuit 88 provides detection of intermittent AC power. The same circuit also detects when the power is reap plied. The detection of an intermittent outage is performed by a latch and must be cleared by the microprocessor 20. The power failure and status circuit includes logic components of a conventional nature which detect the presence or absence of AC power to provide outputs indicative of power status.

Using conventional programming techniques, a primary function of system 12 is to continuously monitor the status of user equipment at the remote site in order to detect and act upon the presence of fault conditions. This is done by sampling digital and analog input signals received through converter 58 and comparing the results with programmed criteria. In addition, system 12 continuously monitors its own environment-indicating parameters, such as temperature and power availability.

All faults that are detected by the status-monitoring facility are subjected to a screening process that determines whether the fault is to be reported to an operator. This screening process, referred to herein as alarm management, is discussed above.

The system of the invention can monitor the status of any user equipment providing either form "C" or form "A" alarm outputs. In this embodiment, up to twelve such signals are supported by a single system 12.

The input signals are referred to as signals 1 through 12 appearing at 50-pin connector 30. The type and significance of each input signal are determined by the user at any time through programming. The correlation between an input signal and user equipment is transparent to the inventive system.

The system of the invention is capable in the known manner of detecting and acting upon transitions in the state of each individual digital input signal. The system periodically scans the input signals to sense any two consecutive changes in state. Unused signals are not scanned.

The system of the invention can monitor up to, in the preferred embodiment, four user-supplied analog signals. These signals are fed through the system using conventional BNC connectors mounted on the rear panel. The significance of these levels is determined by the user at any time through programming. The correlation between a connector and a particular signal path (e.g., transmit or receive) is transparent to the system.

The system periodically converts the analog signals to digital values in the range of 0 to 150, and unused analog inputs are not scanned On a per-signal basis, the user can specify a range of normal values. Values that are above or below the range for two consecutive scans are considered to indicate a fault condition. A fault condition is considered to be cleared only after the signal has returned to and stayed in the normal range for two consecutive scans. If desired, these transitions into and out of fault conditions can be logged on a printer, such as printer 16. Each analog input signal can be associated with a corresponding control output signal such that the presence or absence of a fault on the input signal determines the state of the output port. The system can be interrogated for current value of each analog signal, and the value reported shall be the last-sampled value.

Temperature sensors 90a and 90b are provided as a feature of the system. The significance of these sensors is determined by the user at any time through programming. The user may specify a normal range for each temperature sensor and temperature readings above or below the normal range for two consecutive scans constitute a fault condition. Similarly, a temperature fault it cleared when the temperature returns to and stays within the normal range for two consecutive scans.

The system of the invention utilizing real clock 22 maintains an on-board clock and calendar. The date and time can be set as often as desired as part of the programming function. The system can be queried for the date and time as part of the status-reporting function.

As a result of the aforementioned status monitoring, the system of the invention may detect any and all of the following faults:

A. temperature (from the temperature sensors too high or too low);
B. AC power loss;
C. system test failures, such as weak battery, conversion error, printer off-line or nonfunctioning, non-volatile memory failure, and tone generation decoding failure;
D. digital input signals 1 through 12 including invalid form C, fault condition, or disconnection; and
E. analog input signals a through d as either too high or too low.

Figure 3:
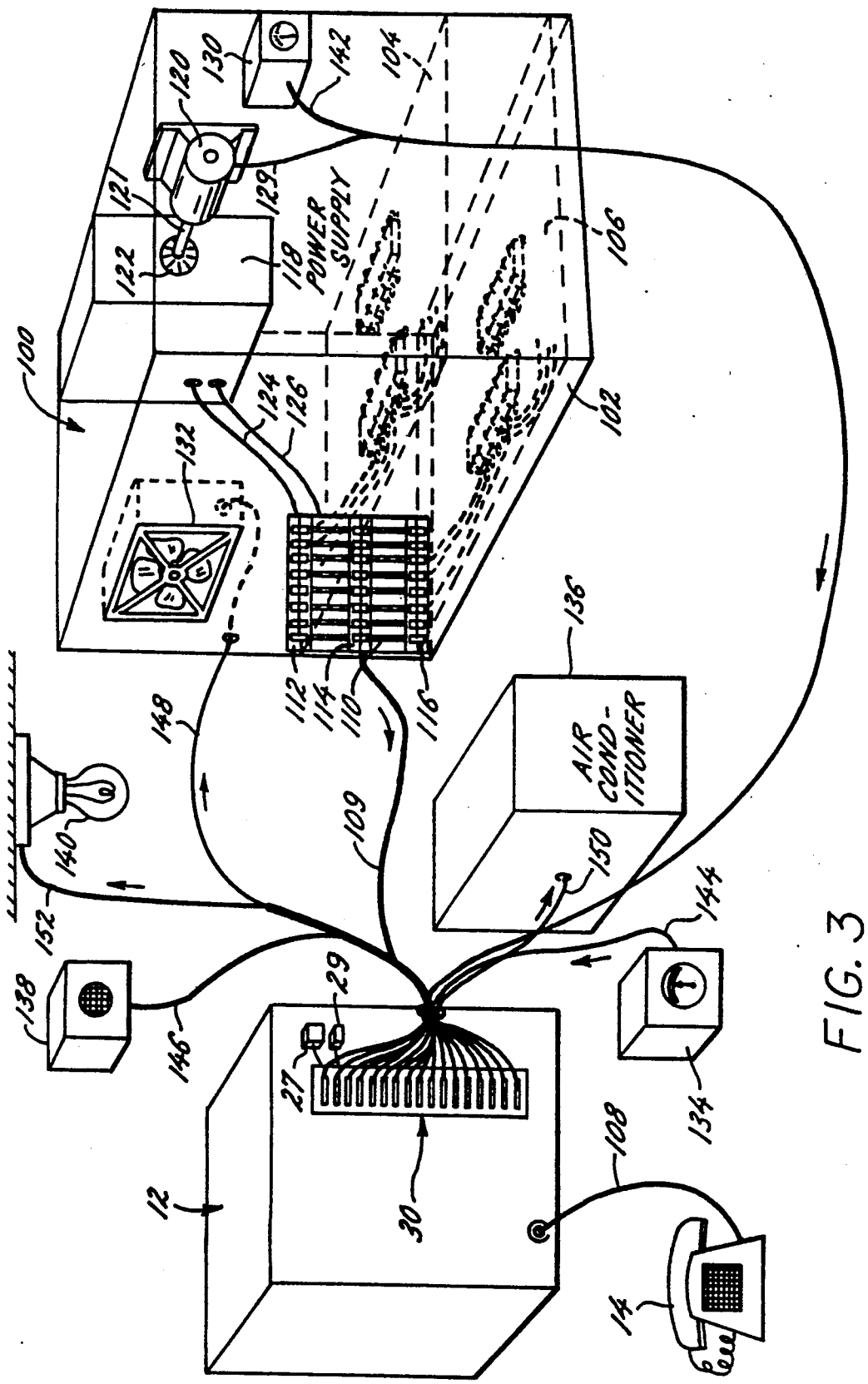
FIG. 3 is a schematic view of a monitoring and control apparatus according to the invention connected to monitored equipment.

In accordance with the invention, as shown in FIG. 3, a monitoring and control system 12 is connected to a piece of monitored equipment 100 and to various environmental sensors and controllers. In the illustrated configuration, the monitoring and control system monitors environmental parameters by receiving inputs from environmental sensors. Also, the system monitors operating parameters of the equipment 100 by receiving inputs from the equipment components. In order to control the equipment being monitored in view of inputs from the equipment components, the system has a programmable memory which defines (a) the source of control commands according to whether the apparatus is in an operator-controlled or an automatic mode and (b) the response to the control command represented by the form of the control signals at the output ports of the microprocessor. To achieve this result, the system has a programmable memory which controls the operation of the system to process control commands derived from a first source, herein shown as operator-generated DTMF signals received over the public telephone network 108 from the telephone 14, when in the operator-controlled mode, and from a second source, herein disclosed as signals produced by pre-programmed operation of the microprocessor 20 responsive to a particular condition in the monitored equipment, when in the automatic mode. The system then produces, at output ports 23, control signals of different form to control the monitored equipment in response to control commands from one of the sources, a first form of control signal producing a first type of equipment response and a second form of control signal producing a second type of equipment response to control equipment conditions.

Thus, in response to an operator command or automatically, the system drives outputs which actuate switches to turn environmental control components and devices on or off and switch equipment components to desired states.

As an example of how this system may function in keeping with the invention, the monitored equipment 100 is made up of a housing 102 with a primary printed circuit board 104 and a functionally identical spare printed circuit board 106. The system is used, in this example, for monitoring parameters, such as voltage levels on the primary board 104, and is programmed to detect conditions such as primary board voltage levels outside preset limits. By operator control or automatically, the system disconnects the faulty primary board 104 and connects the spare board 106 in the primary board's place. The system also monitors environmental parameters, such as ambient light intensity, temperature, and humidity, and is programmed to turn a light, fan, or air conditioner on or off to bring the monitored environmental parameters back within the preset limits when conditions outside the limits are detected In the example shown in FIG. 3, the monitoring and control system 12 is connected through cable 108 to a telephone 14 on a public telephone network. The system has a connector 30 through which the digital input and digital output ports (shown, respectively, as 31 and 33 in FIG. 2A) interface with the monitored equipment and other outside devices.

For electrical connection to the system 12 and interconnection between the primary and spare boards 104, 106, a back plane 110 is mounted inside the housing 102, connected to connector 30 by a cable 109, and providing electrical connections between edge connectors 112, 114, and 116. The boards 104 and 106 each have a plurality of edge-connector contacts (not shown) which mate with edge connectors 112 and 116, respectively, and provide electrical connections between the boards 104 and 106 and the back plane 110.

As a further illustration of the conditions that may be monitored, a variable condition of a component represented by a variable voltage level may be monitored, and an adjustable power supply 118 may be provided which is adjustable to control the monitored condition. The output voltage of the power supply 118 in this example is controlled by a servo motor 120 mounted in the housing 102 and having a shaft 121 which rotates and adjusts the voltage control 122 on the power supply 118. The adjustable power supply 118 is connected by cables 124 and 126, respectively, to the back plane 110. In order to provide incremental adjustments of the power supply voltage, the servo motor 120 is activated by a switch 27 (FIG. 2A) which is connected by a cable 129 to the servo motor 120 and is actuated from one of the controlled outputs OUT 1 of the system. The system is programmed by providing a program in memory which defines the response to a control command derived from either DTMF signals generated by an operator of a telephone 14 when the system is in the operator-controlled mode or from signals produced responsive to an alarm condition when the system is in the automatic mode to provide control signals which cause momentary actuation of the switch 128 to advance or retard the servo motor 120 and cause an incremental increase or decrease in the output of the power supply 118. Thus, when the monitoring and control system detects an increased or decreased signal voltage representing a change in a variable condition, either automatically or by operator command, the system is programmed to incrementally adjust the power supply voltage until the signal voltage is at the desired level.

As an example of monitoring environmental parameters, the temperature inside the housing 102 is monitored by a thermometer 130. A fan 132 is mounted on the housing 102 so as to control air flow between the exterior and interior of the equipment 100. The room temperature is monitored by a thermometer 134. To reduce the temperature and humidity of the air, an air conditioner 136 is provided. For monitoring outside light intensity, a light sensor 138 is provided. An electric light 140 illuminates the room.

Analog inputs from the thermometer 130, the thermometer 134, and the light sensor 138 are supplied via cables 142, 144, and 146, respectively, to the connector 30. Thus, the monitoring and control system monitors these environmental parameters. Digital outputs are connected through the connector 30 to switches, such as 27 or 29, and cables 148, 150, and 152 to the fan 132, the air conditioner 136, or the electric light 140, respectively. Thus, either in response to an operator-generated DTMF signal through the telephone network from the telephone 14, the system controls the states of the fan 132, the air conditioner 136, and the light 140 to bring the monitored parameters within preset limits.

Each fault that occurs is subjected to a screening process through conventional programming of microprocessor 20 which determines whether the fault is to be automatically reported to an operator. It should be noted that it is not possible to screen out power failure faults or self-test failures. For each monitor point, the user programs (a) whether a fault condition on this monitor point is ever to be reported and (b) how long the fault condition must be present before it is reported to an operator. A fault condition present for the minimum specified duration is considered to be an alarm condition.

An alarm is considered to be active as long as the fault condition on the monitor point remains.

When an alarm condition occurs, the system of the invention automatically dials a programmed telephone number or numbers, identifies itself to the operator, and reports significant information using voice synthesis.

In accordance with the principles of operation, the system of the invention requires that each alarm be acknowledged by an operator using the telephone keypad. It will continue to dial a primary and up to a given number of telephone numbers until the alarm is acknowledged or all phone numbers have been tried a specified number of times. Unsuccessful reporting of an alarm is noted by the system and is logged on the printer. The log entry includes the identification number of the responding operator. Operators can receive alarms without acknowledging them. In such a case, the system continues to dial alternate numbers until the alarm is acknowledged or the retry count is exhausted.

When the detection of a single alarm triggers an outgoing call, the bus status monitoring is not suspended. Thus, by the time an operator is reached, there may be more than one alarm to be reported. Conversely, the fault condition that generated the alarm may have already been corrected. For this reason, the occurrence of an alarm condition is recorded in a time-ordered manner. In its random access memory, the system maintains information about an alarm condition as long as the alarm condition is still active and has not been acknowledged, or it is one of the last ten past alarms. Past alarms are presumed to have been both cleared and acknowledged. At least ten unacknowledged alarms shll be maintained in memory.

When dialing out, the system of the invention shall automatically report all unacknowledged alarms, whether or not they are currently active. The last ten past alarms can be obtained through the statusreporting function. The same is true of active alarms that have already been acknowledged.

In the preferred embodiment, the alarm records include the following information: (a) monitor point, (b) alarm condition, (c) date and time of detection, (d) date and time cleared (if cleared), (e) identity of acknowledging operator (if acknowledged), and (f) site identification.

Status is reported to operators upon demand. Status reports can be selected individually for each of the following: (a) date and time, (b) temperature readings, (c) active alarms, (d) alarm history for the past ten alarms, (e) individual digital input states, (f) individual analog input values, (g) individual digital output states, (h) battery charge, and (i) system test.

An operator can obtain status by dialing the system and identifying himself using a "password". Status queries can also be made if the system dials the operator, in which case the operator is given a choice after all unacknowledged alarms have been reported. The status-reporting function allows the operator to monitor equipment after an alarm has been reported. It also allows the operator to check the status of input signals that are not configured to generate alarms. Such signals may be ones that have significance only in diagnositic modes.

An important function of the system of the invention is the programming function. According to the principles of the invention, the system can be programmed to meet specific requirements for each installation. This can be done by authorized users as often as desired from a telephone keypad at any location. As with other functions, authorization to change system parameters is controlled via a programmer password. The system's microprocessor 20 controls a voice synthesizer 34 to report the current programming parameters and to prompt new input. Validity checks are performed on operator responses. For all programmable parameters, default values are predetermined and will be in effect until the unit is programmed otherwise. Changes in programmable parameters may be logged on a printer.

As a result of the aforementioned programming function, the system of the invention may be programmed with any or all of the following parameters:
 (a) system identification (identifies the individual unit to the operator using synthesized voice and prints the identification on the printer);
 (b) printer parameters (sets printer control, i.e., supervised site or remote, disable/enable, and telephone numbers of remote printers);
 (c) passwords (operator passwords and the operators to whom they were assigned and programmer passwords and the programmers to whom they were assigned);
 (d) telephone parameters (the telephone numbers to be called in case of an alarm and the sequence they are to be called, the type of telephone, i.e., pulse or tone, the number of auto-dial retries in case of an uncompleted call, and the number of rings before system 12 auto-answers);
 (e) digital alarm input parameters (enable/disable the port and/or alarm, set type, i.e., from "A" or "C", set normally open or closed, and duration in seconds before making alarm phone call);
 (f) analog/temperature input parameters (enable/disable the port and/or alarm, set type, i.e., "A" or "C", set high and low thesholds, and the duration in seconds before making alarm phone call);
 (g) control output parameters (enable/disable, set user control or automatic, and normally open/closed);
 (h) setting date and time; and
 (i) enable/disable auto-dial.

Calls to the system 12 of the invention can be initiated from any telephone. The call begins with a known "hand shaking" protocol. The system uses voice synthesis to announce its identification and to request a password The identification number is specified by the user, and up to ten digits may be specified. After this introduction, the system controls progress of the call by prompting for input and processing DTMF tones according to its current state. The operator is given sufficient flexibility to choose the order in which actions are taken, i.e., status queries, equipment control, and programming commands can be utilized in any order.

The system will remain off-hook until the operator explicitly releases control or until two minutes have elapsed since the last operator response. The operator is warned before the call is disconnected.

The system of the invention can dial out using either tone or pulse codes. The mode may be set at any time by programming. The system maintains a directory of telephone numbers in the memory, and these numbers are specified by the user and can be changed as often as desired.

On out-going calls, the system 12 dials the number and uses call progress monitoring to detect when the called phone goes off-hook. If the line has not gone off-hook after a specified time, the system 12 hangs up and dials another number if the userspecified retry count has not expired.

The system also uses its auto-dial capabilities to send information to a remote printer. The telephone number of each remote printer is specifed to the system 12 by the user.

Using call progress monitoring, the system can detect in-coming calls and go off-hook after a userspecified number of rings. Upon receiving an incoming call, the system identifies itself and prompts the operator to do the same. An operator that provides either a valid operator password or the programmer's password is allowed to issue commands and acknowledge alarms. An operator that gives the generic operator response is only allowed to hear unacknowledged alarms.

Using a predetermined vocabulary through speech synthesizer 34, the system synthesizes voice in order to identify itself, report status, report alarms, and prompt the operator for DTMF inputs. Voice is used only for calls to the operators. It is not used to send information to the printer.

The system is capable of decoding all sixteen DTMF tones in the known manner, and these tones are interpreted according to the current state of the call in progress. DTMF tones are accepted on both auto-answer and auto-dial calls. They are generated by the operator to query for status, program the system, and control the output ports.

The system can detect DTMF tones any time during an off-hook condition. Depending on its current state, it may or may not defer processing of the tone until it has completed its current speech output.

Using conventional programming techniques, access to information and control capabilities of the system are secured by operator passwords. Upon dialout or answering a call, the system will identify itself and request the operator to do the same, and the system 12 will disconnect if no valid response is entered within, in this case, two minutes.

In the preferred embodiment there are three levels of privilege.

(1) If no operator password is specified, the system will provide only the list of unacknowledged alarms. It will not consider the alarms to be acknowledged. Any logged events requiring operator identification will use the number 0 to identify a respondent who did not provide a password.

(2) If a confidential operator password is entered, the operator will be able to acknowledge alarms, control equipment, and obtain status. Each system of the invention can be programmed to recognize a predetermined number of operator passwords These passwords uniquely identify an operator.

(3) The highest privilege level is that of a programmer. A single programmer can be specified for each system unit A respondent that enters the programmer password will be allowed to change parameter as well as obtain status, acknowledge alarms, and control equipment. It should be noted that all pass words are programmable, and only a respondent using the programmer password can change any of the passwords.

As indicated in the drawings, the system may communicate with a printer locally attached via serial interface and/or with up to two remote printers. In the case of a remote printer, the system dials the number of a printer with an auto-answer modem and reports information using standard modem tones. As the system is programmed, log printer entries are generated for the following events (a) fault detection, (b) fault clearing, (c) alarm condition, (d) alarm clearing, (e) equipment control, (f) program parameter change, and (g) auto-dial enabled/disabled.

If log entries occur at a faster rate than they can be printed, up to a maximum of twenty events will be buffered. All logged events will include a time stamp to the nearest second of when they occurred.

Figure 4:
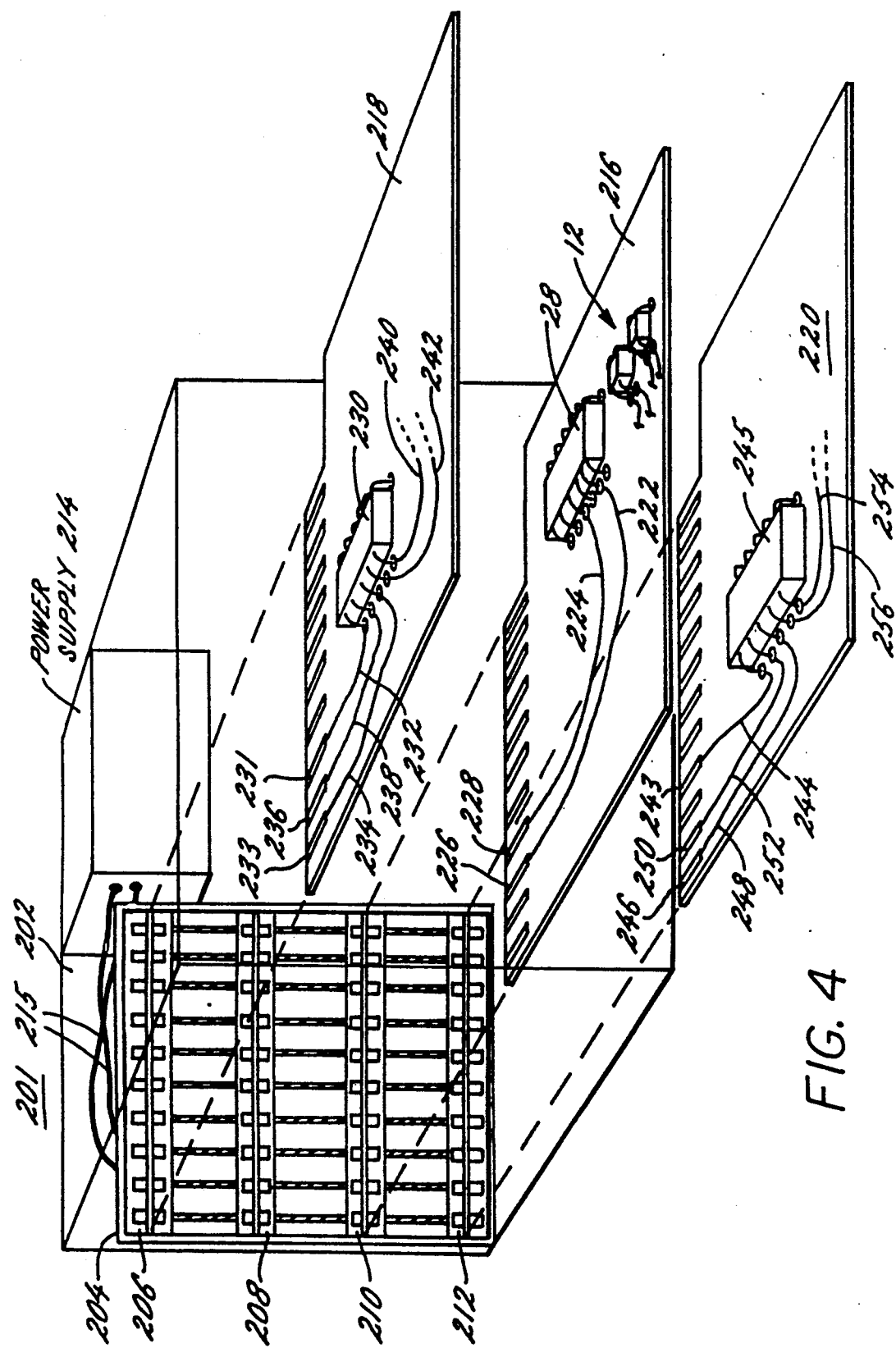
FIG. 4 is a schematic view of a monitoring and control apparatus according to the invention integrated into monitored equipment.

Further in accordance with the invention, as illustrated in FIG. 4, the monitoring and control system may be integrated into equipment being monitored. For this purpose, the electronic components of the monitoring and control system may be supported on a board mounted within a housing also enclosing the monitored equipment. The monitored equipment, for example, might be a computer having a primary board carrying memory integrated circuits.

In keeping with the invention, a spare board carrying memory integrated circuits and constructed similarly to the primary board may also be mounted within the housing. The monitoring system may be used for monitoring parameters, such as voltage levels, and detecting fault conditions represented by, for example, the voltage levels varying outside preset limits, in the primary board. Automatically or by operator control, the control system may disconnect the primary board and connect the spare board to replace the faulty primary board. Thus, the system will enable the equipment to continue functioning properly.

In the example shown in FIG. 4, the equipment 201 being monitored and controlled is enclosed in a housing 202 which can accommodate a plurality of printed circuit boards supported by slots on the inside of the housing 202 (slots not shown) including the primary and spare boards. To provide electrical connections between the printed circuit boards, a back plane 204 provides electrical connections between electrical contacts in a plurality of edge connectors 206, 208, 210, and 212, with which the boards mate. +5 volt power and 0 volt ground potential are supplied to the boards from a power supply 214 via cables 215 through the back plane 204 and the edge connectors.

FIG. 4 shows an exploded view of a system in which the housing 202 encloses three printed circuit boards. A monitoring and control board 216 supports the components making up the monitoring and control system 12 including the digital I/O port interface 28 and other circuit components of the system, such as the microprocessor and memories referred to connection with FIG. 2. The system 12 monitors and controls the equipment 201 by receiving input signals from monitored points and by transmitting output signals to control device through the interface 28 via copper traces on the boards. In the illustrated embodiment, the primary board 218 is being monitored and controlled. A spare board 220, functionally identical to the primary board 218, is also monitored and controlled.

Copper traces 222 and 224 connected to digital I/O port interface 28 carry the digital outputs OUT 1 and OUT 2, respectively, to edge connector contacts 226 and 228, respectively. Thus, the edge connectors 206, 208, 210, and 212 and the back plane 204 will connect digital outputs OUT 1 and OUT 2 to the primary board 218 and the spare board 220.

The programmed apparatus provided by the monitoring and control board 216 connects and disconnects the primary board 218 from the equipment 201 by connecting and disconnecting power to the primary board 218. To achieve this, in the illustrated embodiment the control board 216 drives the digital output OUT 1 via an edge connector contact 231 and a copper trace 232 leading therefrom to the switch 230 to control a power cut-off switch 230 on the primary board 218 which is supplied with +5 volt power from the back plane 204 through the edge connector 206, an edge connector contact 233, and a copper trace 234. The switch 230 is similarly supplied with 0 volt ground potential from the back plane 204 through the edge connector 206, an edge connector contact 236, and a copper trace 238. The switch 230 provides power and ground to the remainder of the equipment components on the primary board 218 through copper traces 240 and 242, respectively.

The programmed apparatus provided by the monitoring and control board 216 also connects and disconnects the spare board 220 from the equipment 201 by connecting and disconnecting power to the spare board 220. For this purpose, the control board 216 drives the digital output OUT 2 via an edge connector contact 243 an a copper trace 244 leading therefrom to control a power cut-off switch 245 which is also supplied with +5 volt power from the back plane 204 through the edge connector 212, an edge connector contact 246, and a copper trace 248. The switch 245 is similarly supplied with 0 volt ground potential from the back plane 204 through the edge connector 212, an edge connector contact 250, and a copper trace 252. The switch 245 provides power and ground to the remainder of the equipment components on the spare board 220 through copper traces 254 and 256, respectively.

With the monitoring and control system and a spare board 220 integrated into the equipment 201, as illustrated in FIG. 4 and described above, the system can, in response to a fault detected on the primary board 218, drive the digital output OUT 1 so as to cause the switch 230 to disconnect power to the primary board 218 and drive the digital output OUT 2 so as to cause the switch 245 to connect power to the spare board 220. This effectively disconnects the primary board 218 from the equipment 201 and connects the spare board 220 to the equipment 201 in its place. Since the primary board 218 and the spare board 220 are functionally identical, this operation of the monitoring and control system removes the faulty primary board, replaces it with a good spare board, and permits the equipment to continue functioning without on-site servicing.

It is to be understood that the specific construction and principles of operation of the system described hereinabove are considered only to be exemplary of the principles of the invention. It is to be understood as well that a variety of modifications and changes in the described system can be used while remaining within the scope of the invention as defined in the appended claims.

I claim:

1. A monitoring and control apparatus which monitors conditions of equipment and a power source at a work site, said apparatus comprising:

a programmable microprocessor and a microprocessor bus which carries signals to and from said microprocessor;

input ports connected to said bus providing status signals representing monitored conditions which are carried on said bus to said microprocessor;

output ports connected to said bus providing equipment control signals which are carried on said bus from said microprocessor;

memory means associated with said microprocessor;

operating means including programs and operating parameters stored in said memory means for causing said microprocessor to process status signals and detect a fault condition by sampling the status signals and comparing with the operating parameters stored in said memory means, to produce an alarm when it is determined that the fault condition qualifies as an alarm condition, and to provide signals which represent the alarm condition; and transmitting/receiving means including a modem and telephone interface for automatically dialing out over a telephone network in response to an alarm, for transmitting information as to the alarm in the form of data signals and/or synthesized voice signals over the telephone network to a remote location in response to an alarm;

said transmitting/receiving means also being operable to receive over the network from the remote location incoming signals which represent corrective operation of equipment, and incoming signals which represent modifications to the operating parameters stored in memory; and said operating means causing said microprocessor to decode the incoming signals and produce equipment control signals or signals which modify the operating parameters stored in said memory means in accordance with the contents of the incoming signals.

2. An apparatus according to claim 1 wherein said memory means stores alarm information about monitored conditions including at least one of: monitor point, date and time of detection, date and time cleared (if cleared), identity of acknowledging operator (if acknowledged), and site identification; and the apparatus further includes printer means at a remote location connected to said apparatus at the work site through the telephone interface for logging the alarm information maintained in said memory means.

3. An apparatus according to claim 1 including a power interruption device operated by control signals from said bus and connected between a power source and a terminal; and said operating means causing said microprocessor to produce control signals on said bus for operating said power interruption device to cut-off the power source and deactivate said terminal and to connect the power source and activate said terminal in response to signals received by said microprocessor.

4. An apparatus according to claim 3 including a power source status detection circuit connected to provide status signals on said bus processed by said microprocessor to produce control signals on said bus to cut-off the power source and deactivate said terminal after a power failure is detected and to re-connect the power source and activate said terminal after power is reapplied.

5. An apparatus according to claim 3 wherein said terminal is included in a power supply circuit.

6. An apparatus according to claim 3 wherein said power supply circuit is connected to supply normal power to said apparatus.

7. An apparatus according to claim 1 wherein said operating means causes said microprocessor to screen a detected fault condition and determine whether or not the fault condition is to be reported to an operator based on a predetermined qualification for an alarm condition.

8. An apparatus according to claim 1 wherein said operating means causes said microprocessor to reprogram the parameters stored in memory only after a password has been received over the network representing a programmer privilege level.

* * * * *